United States Patent

Morokuma et al.

[11] 4,045,864
[45] Sept. 6, 1977

[54] METHOD OF MANUFACTURING MAGNETIC HEADS

[75] Inventors: Tadashi Morokuma, Tokyo; Naotsune Tsuda, Hachioji, both of Japan

[73] Assignee: Olympus Optical Co. Ltd., Tokyo, Japan

[21] Appl. No.: 703,501

[22] Filed: July 8, 1976

[30] Foreign Application Priority Data

| July 29, 1975 | Japan | 50-92337 |
| Apr. 20, 1976 | Japan | 51-45108 |
| May 8, 1976 | Japan | 51-52527 |

[51] Int. Cl.² ............................................. G11B 5/42
[52] U.S. Cl. .................................................... 29/603
[58] Field of Search ............... 29/603; 360/119, 121; 219/121 P, 121 EM, 121 LM

[56] References Cited

U.S. PATENT DOCUMENTS

| 3,605,258 | 9/1971 | Fisher et al. | 29/603 |
| 3,629,519 | 12/1971 | Hanak | 29/603 |
| 3,819,348 | 6/1974 | Murray | 29/603 X |

Primary Examiner—Carl E. Hall
Attorney, Agent, or Firm—Ostrolenk, Faber, Gerb & Soffen

[57] ABSTRACT

A method is provided of manufacturing magnetic heads which comprises the steps of providing a pair of core block pieces each having a gap defining surface, masking a pair of spaced areas of the gap defining surface of one core block piece, subjecting the gap defining surface of said one core block piece to etching by an ion beam or plasma sputtering, disposing the etched core block piece and the other non-etched core block piece in abutting relationship so that the respective gap defining surfaces are located opposite to each other, placing a gap forming material in a clearance formed between the gap defining surfaces of the both core block pieces as a result of the etcning step applied to one of the gap defining surfaces, causing the gap forming material to melt and permeate into the clearance, and subsequently causing the gap forming material to solidify to provide a core block, which is cut to size to produce a core or cores.

4 Claims, 13 Drawing Figures

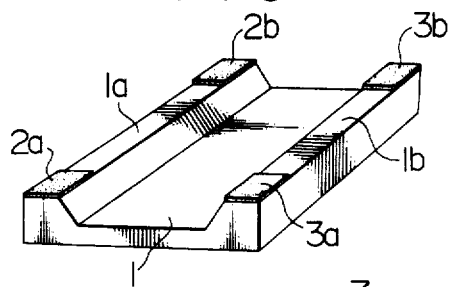
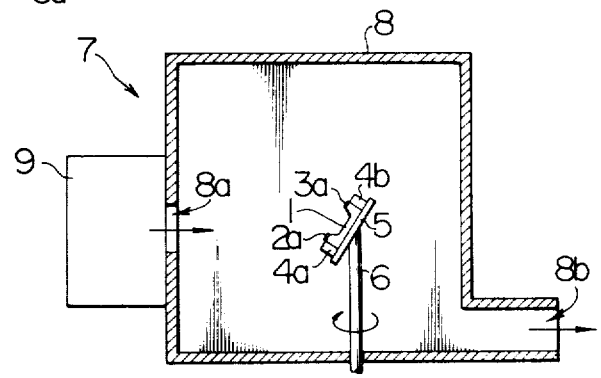
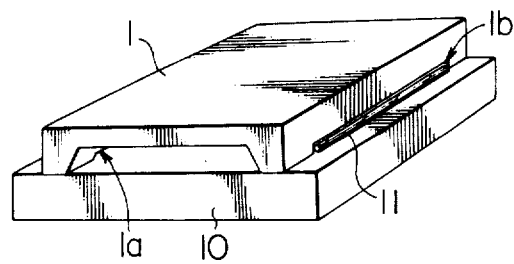
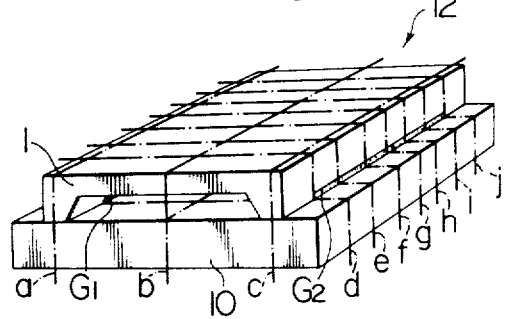

METHOD OF MANUFACTURING MAGNETIC HEADS

BACKGROUND OF THE INVENTION

The performance of magnetic heads is dominated by the accuracy with which the gap can be formed. With a small size or miniature magnetic head to which the invention is directed, the gap length is as small as of the order of 1 to 2 microns, and it is extremely difficult to form a gap of such length with a high degree of accuracy. In the prior art practice, a gap has been formed by disposing a pair of core block pieces in abutting relationship so that their gap defining surfaces are located opposite to each other, with a spacer comprising a thin sheet of mica or metal foil interposed therebetween. A gap forming material is caused to melt and permeate into a clearance formed between the two gap defining surfaces by the presence of the spacer, and subsequently solidified. With this technique, there results a high manufacturing cost, inasmuch as the spacer material itself is expensive and a considerable difficulty is experienced in machining the spacer to a thickness of 1 to 2 microns with a high accuracy.

SUMMARY OF THE INVENTION

It is an object of the invention to provide a method of manufacturing magnetic heads which eliminates the above difficulties involved with the formation of a small length gap in a small size magnetic head and which enables a gap of a high accuracy to be easily machined in the core without the use of the spacer.

The method according to the invention comprises the steps of providing a pair of core block pieces each having a gap defining surface, masking a pair of spaced areas on the gap defining surface of one core block piece with an etch resistant material such as aluminum, subjecting the gap defining surface of said one core block piece to an etching operation by employing an ion beam or plasma sputtering to form a recess of a depth which is equal to a desired gap length, disposing the core block pieces in abutting relationship so that their gap defining surfaces are located opposite to each other, placing a gap forming material in a clearance formed between the gap defining surfaces of the core block pieces as a result of the etching operation performed upon one of the gap defining surfaces, causing the gap forming material to melt and permeate into the clearance, solidifying the gap forming material to provide a core block having a desired gap length, and cutting the core block to size, thereby producing a core or cores.

BRIEF DESCRIPTION OF THE DRAWINGS

FIG. 1 is a perspective view of a core block piece which is used in the method of the invention;

FIG. 2 is a schematic cross section of an ion beam sputtering apparatus;

FIG. 3 is a perspective view of a pair of core block pieces disposed in abutting relationship;

FIG. 4 is a perspective view of a core block which is produced by the method of the invention;

DETAILED DESCRIPTION OF EMBODIMENTS

Figure 5:
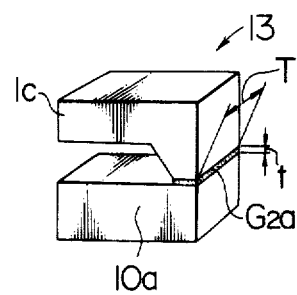
FIG. 5 is a perspective view of a single core which is produced by the method of the invention.

Referring to FIG. 1, there is provided a core block piece 1 of a ferromagnetic oxide material which includes a pair of gap defining surfaces 1a, 1b formed on a pair of elongated projections extending along the opposite sides thereof. The opposite ends of the gap defining surfaces 1a, 1b are covered with masks 2a, 2b; 3a, 3b of an etching resistant material such as aluminium. The masks are applied as by the use of a suitable jig.

As shown in FIG. 2, the core block piece 1 is mounted on a support table 5 by using a pair of jigs 4a, 4b. The jigs and the support table are formed of an etching resistant material such as aluminium. The support table 5 is mounted in a skewed position on a support rod 6 which is also formed of an etching resistant material. This assembly is received in a chamber 8 of an ion beam sputtering apparatus 7. An opening 8a is formed in the left-hand sidewall of the chamber 8 for transmitting an ion beam therethrough, which beam is supplied from an ion beam emitter 9 which is located on the left-hand side thereof. An exhaust opening 8b is formed in the lower portion of the right-hand wall of the chamber 8 and communicates with a suitable exhaust system, not shown.

The support table 5 and the support rod 6 are both hollow, and the cavity therein is supplied with a flow of cooling water as by connecting the rod 6 with a water supply, not shown. In addition, the support rod 6 is connected with a mechanical drive, not shown, for rotating the support table 5 together with the core piece 1 carried thereon with a speed which is on the order of 60 rpm.

The chamber 8 is sealed and evacuated to a pressure of the order of $10^{-5}$ to $10^{-6}$ torr. Subsequently the ion beam emitter 9 is activated to cause an ion beam to impinge on the rotating core block piece 1 after passing through the opening 8a. A suitable angle of incidence of the ion beam on the target, namely, on the surface of the core block piece 1 is chosen depending on the desired value of working efficiency and the desired finish of the polished surface. As a result of the sputtering action of the ion beam, the core block piece 1 is etched to a suitable depth, whereupon the emitter 9 is deactivated and the core block piece 1 removed. When the masks 2a, 2b, 3a, 3b are removed, the areas lying immediately below these masks have an increased elevation as compared with the remainder of the gap defining surface since they are not subjected to the etching process. This increase in elevation corresponds to a desired gap length as will become apparent from the following description.

As shown in FIG. 3, the core block piece 1 thus worked is placed on top of another core block piece 10 of a ferromagnetic oxide material and having a flat top surface. A pair of round glass rods 11 (only one being shown) are placed adjacent to the etched gap defining surfaces 1a, 1b, and are heated to the melting point of the glass in an inert gas atmosphere, whereupon the glass 11 melts to permeate into the clearances formed between the block pieces 1, 10. Then the assembly is allowed to cool down, thereby obtaining a core block 12 as shown in FIG. 4. It will be seen that the clearance between the gap defining surfaces 1a, 1b of the core block piece 1 and the other core block piece 10 is filled with the molten glass which has permeated by capillary action, thus forming a pair of gaps $G_1$, $G_2$. The resulting core block 12 is cut along planes indicated by phantom lines a, b and c and then sliced along planes indicated by phantom lines d, e, f, g, h, i and j, as shown in FIG. 4, to produce a plurality of cores. One of such cores is indicated by a core 13 in FIG. 5 as being formed by core block pieces 1c, 10a and having a gap $G_2a$. It will be appreciated that the core block shown in FIG. 4 may be cut and sliced in any desired manner. The purpose of cutting the core block shown in FIG. 4 along planes indicated by the phantom lines a, c is to eliminate unnecessary portions thereof which are located on the opposite lateral sides of the core block. The core block 12 is cut along the central plane indicated by the phantom line b when a core having a single gap is desired. The slicing of the core block along a pair of planes indicated by the phantom lines d, j also serves to remove unnecessary portions of the core block 12 which correspond to the masked portions of the starting core block piece 1. Where it is desired to produce a core having both a front and a rear gap, the core block 12 shown in FIG. 4 need not be cut along the plane indicated by the central phantom line b. By choosing a suitable spacing between the phantom lines e to i, any desired track width T (see FIG. 5) can be obtained. The gap length t depends on the depth to which the starting core block piece 1 is etched, and hence on the manner of treatment of the core block piece 1 within the chamber 8. It will be understood that any desired depth can be achieved depending on the selection of the intensity of the ion beam, its angle of incidence and the time period of exposure. It should be also understood that the glass material 11 applied may be in any form such as rod, powder or block, and any other material such as ceramic or enamel may be used as the gap forming material. The configuration of the upper surface of the other core block piece 10 is not limited to a flat surface, but may be in the form of shallow V-shaped surface or a concave curved surface.

Figure 6:
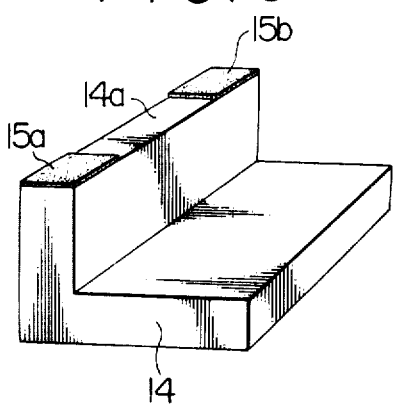
FIG. 6 is a perspective view of another example of a core block piece.
Figure 7:
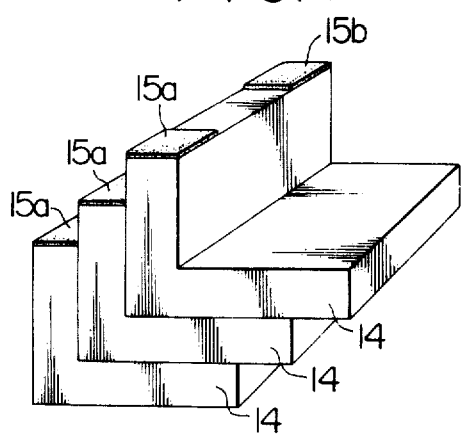
FIG. 7 is a perspective view of a plurality of the core block pieces disposed one upon another.
Figure 8:
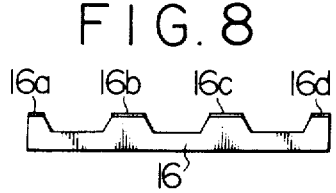
FIG. 8 is a side elevation of a further example of a core block piece.

Referring to FIG. 6, there is shown another example of the core block piece. Specifically, a core block piece 14 has a single gap defining surface 14a along its one side, and the opposite ends of the gap defining surface 14a are covered by a pair of masks 15a, 15b. The core block piece 14 may be substituted for the core block piece 1 mentioned above. In this instance, a plurality of such core block pieces may be disposed one upon another and simultaneously subjected to the sputtering process by the ion beam, as illustrated in FIG. 7. FIG. 8 shows a further example of core block piece 16 which may be substituted for the core block piece 1. The core block piece 16 has a number of gap defining surfaces 16a, 16b . . . 16d on a corresponding number of projections, and thus permit an even greater number of cores to be produced in one process.

Figure 9:
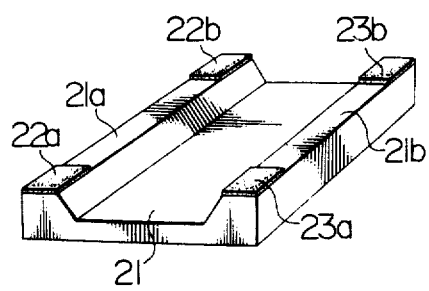
FIG. 9 is a perspective view of a core block piece which is used in the plasma sputtering method of the invention.
Figure 10:
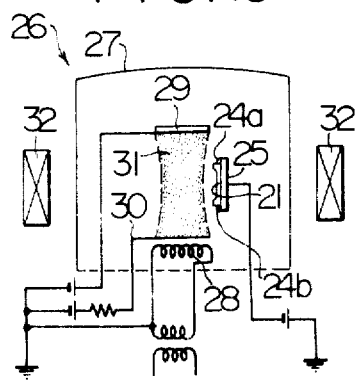
FIG. 10 is a schematic diagram illustrating the arrangement of a plasma sputtering apparatus.

In the above description, the gap defining surface of the core block piece has been etched by the ion beam, which however may be replaced by the bombardment with a plasma comprising electrons and ions. The core block piece used in this instance may be similar in configuration to those described in connection with the preceding embodiments. One example is shown in FIG. 9 where a core block piece 21 of a ferromagnetic oxide material has a pair of projections along its opposite lateral sides on which a pair of gap defining surfaces 21a, 21b are formed. The opposite ends of the respective gap defining surfaces 21a, 21b are covered with etching resistant masks 22a, 22b, 23a, 23b such as aluminium, which are applied by the use of suitable jigs. As shown in FIG. 10, the core block piece 21 is then mounted on a support 25 by using a pair of jigs 24a, 24b. The jigs 24a, 24b and support table 25 are formed of an etching resistant material such as aluminium. The support 25 is received within a bell jar 27 of a plasma sputtering apparatus 26.

The bell jar 27 is sealed and evacuated to a pressure on the order of $10^{-7}$ torr, and is then filled with an inert gas such as argon to maintain a pressure of the order of 1 to $3 \times 10^{-3}$ torr. The bell jar contains a filament 28, an anode 29 and auxiliary anode 30. By energizing the filament 28 and applying a voltage across the anode 29 and the auxiliary anode 30, there is produced a plasma 31 within the bell jar, and the plasma is focussed around the central axis by the application of an external magnetic field from an electromagnetic coil 32.

When the target is maintained at a negative d.c. potential with respect to the potential of the plasma, the positive ions in the plasma bombard the support 25, thus sputtering the surface atoms in the core block piece 21. The sputtering process is terminated when the core block piece 21 is etched to a suitable depth, whereupon it is removed from the bell jar, and when the masks 22a to 23b are removed, areas immediately underlying them have an increased elevation corresponding to a desired gap length.

Figure 11:
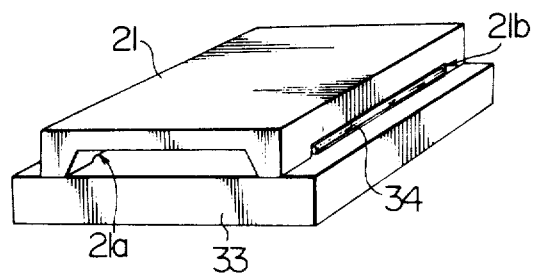
FIG. 11 is a perspective view of a pair of core block pieces disposed in abutting relationship.
Figure 12:
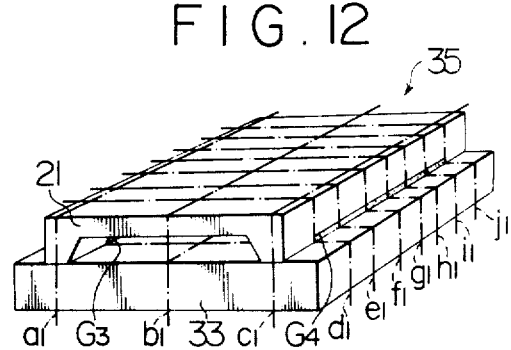
FIG. 12 is a perspective view of a core block which is obtained by the method of the invention.
Figure 13:
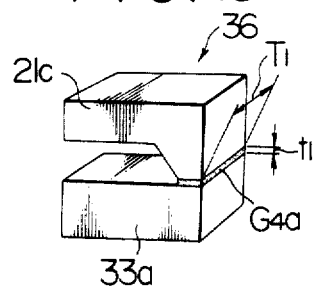
FIG. 13 is a perspective view of a single core produced by the method of the invention.

The core block piece 21 thus worked is placed on top of another core block piece 33 of a ferromagnetic oxide material and having a flat surface, as shown in FIG. 11. A pair of round glass rods 34 (only one being shown) are disposed adjacent to the etched gap defining surfaces 21a, 21b, and heated to the melting point of glass in an inert gas atmosphere. Thereupon the glass 34 melts to permeate into the clearance formed between the both block pieces 21, 33. Subsequently, the assembly is allowed to cool down, thereby obtaining a core block 35 as shown in FIG. 12. It will be understood that the clearances between the gap defining surfaces 21a, 21b of the core block piece 21 and the flat surface of the other core block piece 33 are buried by or filled with the molten glass which permeates by capillary action, thus forming gaps $G_3$, $G_4$. The core block 35 is then cut along planes indicated by phantom lines $a_1$, $b_1$ and $c_1$ shown in FIG. 12, and sliced along planes indicated by phantom lines $d_1$, $e_1$, $f_1$, $g_1$, $h_1$, and $j_1$ as shown in FIG. 12. In this manner, there are produced a plurality of cores, one of which is illustrated by a core 36 shown in FIG. 13 as being formed by core pieces 21c, 33a and having a gap $G_4a$. As before, the core block shown in FIG. 12 may be cut and sliced in any desired manner. The purpose of cutting the core block along the planes indicated by the phantom lines $a_1$, $c_1$ is to remove unnecessary portions which are on the opposite lateral sides of the core block 35. The core block 35 is cut along the plane indicated by the central phantom line $b_1$ when it is desired to produce cores having a single gap. Slicing the core block along planes indicated by the phantom lines $d_1$, $j_1$ serves to remove masked portions thereof. When it is desired to produce a core having both a front and a rear gap, the core block 35 need not be cut along the phantom line $b_1$. By choosing a suitable spacing between the phantom lines $e_1$ to $i_1$, any desired track width $T_1$ may be obtained (see FIG. 13). The gap length $t_1$ depends on the depth to which the starting core block 21 is etched, and hence on the manner of treatment of the core block piece 21 within the bell jar 27. Specifically, a gap length depends on the intensity of the plasma, the angle of its incidence and the time period of exposure. As mentioned previously, the configuration of the glass rods 34 is not limited to a rod form, but such material may be used in other form such as powder or block. In addition, other materials such as ceramic or enamel may be used as the gap forming material. The upper surface of the core block piece 33 is not limited to a flat surface, but may be any other configuration such as a shallow V-shaped surface or a concave curved surface.

A specific method for performing the etching, by sputtering, of the gap defining surfaces of the core block piece with a high efficiency and to a high accuracy will now be described. Since the method is applicable to any form of core block piece, it will be described in connection with the core block piece shown in FIG. 1. The core block piece 1 is immersed in an etchant solution such as hydrochloric acid to etch the non-masked gap defining surfaces 1a, 1b. When the core block piece 1 is etched to a depth which corresponds to nearly one-half the desired gap length, it is removed from the etchant solution and subjected to an ultrasonic cleaning step to remove the acid completely. Subsequently, the resulting core block piece 1 together with its masks is introduced into the ion beam sputtering apparatus 7 shown in FIG. 2 or into the plasma sputtering apparatus 26 shown in FIG. 10 to continue the etching applied to the gap defining surfaces 1a, 1b, thereby finishing the etched depth or gap length to a high accuracy. In this manner the total working time required to etch the gap defining surfaces to a given depth is reduced, lending itself to a mass production while retaining a high degree of accuracy.

What is claimed is:

1. A method for forming magnetic heads, comprising the steps of:
   providing a first core block piece having at least one raised portion upon which a gap defining surface is to be etched;
   masking at least a pair of spaced areas on each of said raised portions with an etch resistant material;
   sputter etching those areas of said raised portions which are not masked so as to form a gap defining surface on each of said raised portions;
   disposing a second core block piece in abutting relation with said non-etched areas of said raised portions so as to form a clearance between each said gap defining surface and said second core block piece;
   causing a gap filling material to melt and permeate into each said clearance;
   solidifying said gap filling material to form a unitary core block; and
   cutting said unitary core block so as to form a plurality of magnetic head cores.

2. A method of manufacturing magnetic heads according to claim 1 in which said step of sputter etching comprises the step of subjecting said first core block piece to an ion beam.

3. A method of manufacturing magnetic heads according to claim 1 in which said step of sputter etching comprises the step of subjecting said first core block piece to a plasma beam.

4. A method of manufacturing magnetic heads according to claim 1 in which subsequent to the masking step and prior to the sputter etching step, said gap defining surface is etched by an acid.

* * * * *